Nov. 7, 1939.　　　E. L. ELWELL　　　2,179,210
STICK-HOLDING RACK
Filed Aug. 25, 1938　　　3 Sheets-Sheet 3
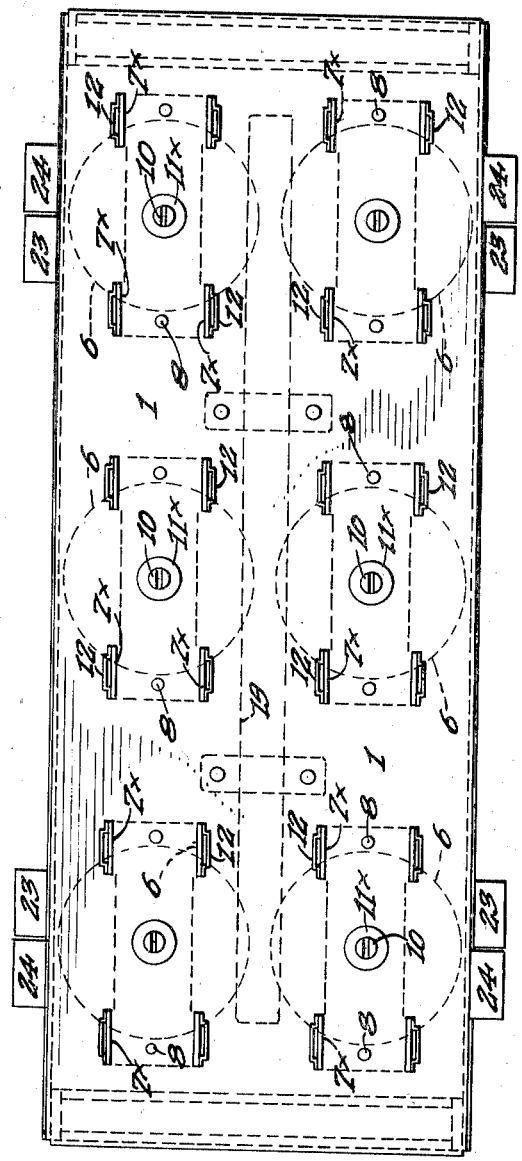
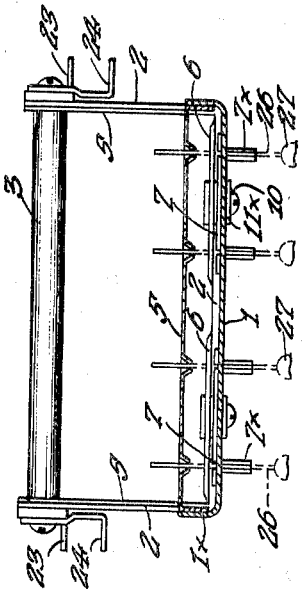
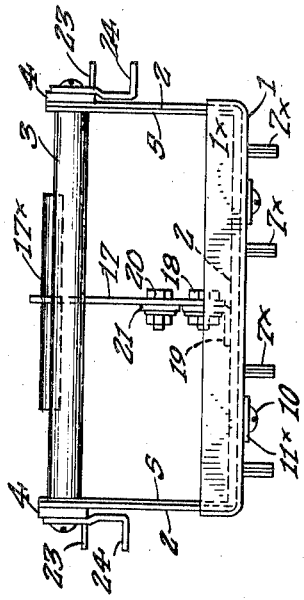
INVENTOR.
Edwin L. Elwell
BY
H. Lee Helms
ATTORNEY.

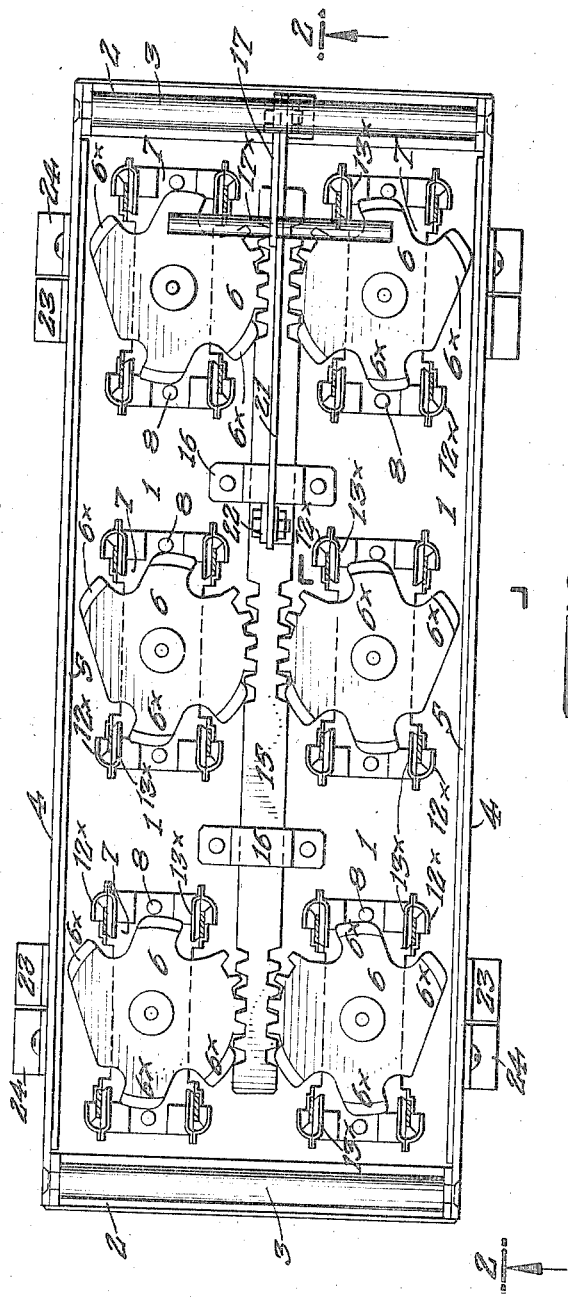

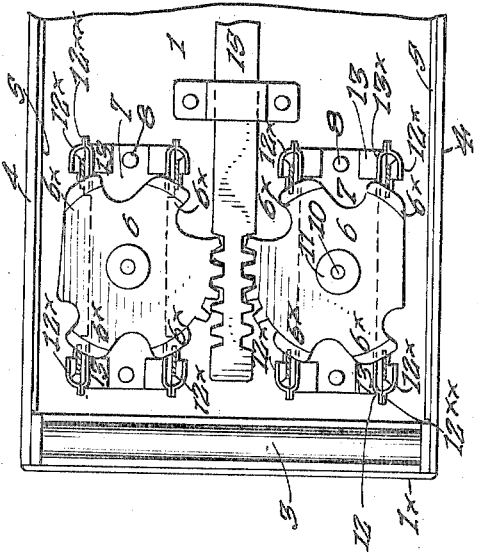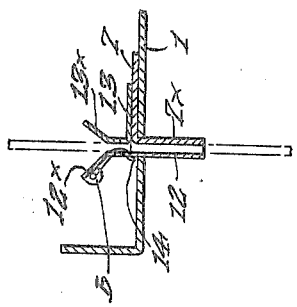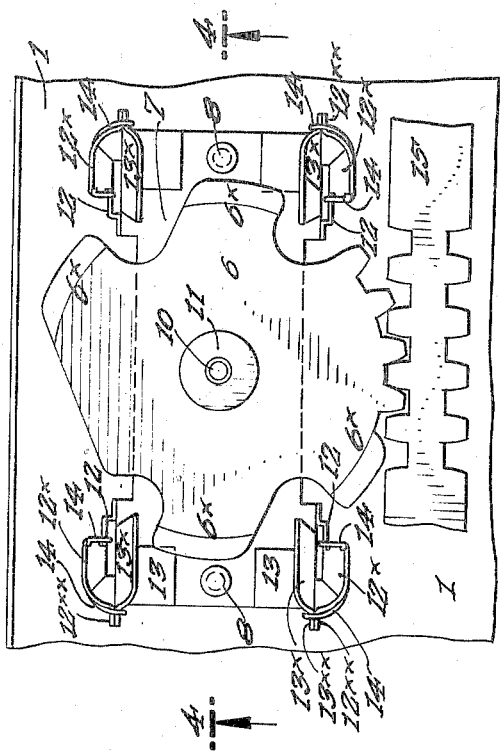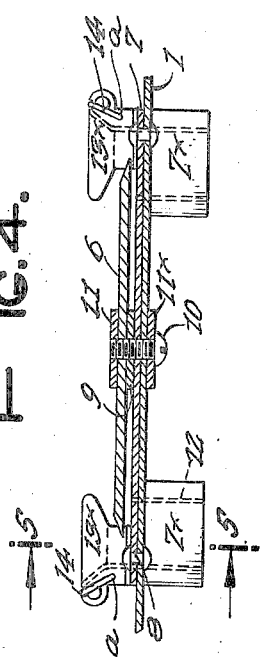

Patented Nov. 7, 1939

2,179,210

UNITED STATES PATENT OFFICE 2,179,210

STICK-HOLDING RACK

Edwin L. Elwell, Baltimore, Md., assignor to Eskimo Pie Corporation, Bloomfield, N. J., a corporation of Delaware Application August 25, 1938, Serial No. 226,679

9 Claims. (Cl. 294—87)

The object of the present invention is to provide a stick-holding rack adapted to hold sticks or handles for frozen confections in the application of sticks to the confections, as by pressure, and in the handling of frozen confections thereafter, as in the dipping of the confections into coating material.

The specific object of the invention is to provide a novel and effective means for clamping the sticks so that they are firmly held in the rack, such means being readily releasable to permit the sticks, weighted by the frozen confections thereon, to be gravitationally withdrawn from the rack.

The invention will be described with reference to the accompanying drawings, in which:

Figure 1 is a top plan view of an embodiment of the invention, sticks being shown in cross-section.

Figure 2 is a side elevation of the structure shown in Figure 1, partly broken away on the line 2—2, Figure 1.

Figure 3 is an enlarged fragmentary section of the device, in plan, showing one of the clamp-wheels and its carrier plate which holds four stick-receiving elements, in combination with the operating rack bar for the wheel.

Figure 4 is a vertical section on the line 4—4, Figure 3.

Figure 5 is a vertical section on the line 5—5, Figure 4.

Figure 6 is a fragmentary plan view showing the left-hand section of the structure with the clamp-wheels in gripping positions, two of the wheels being shown.

Figure 7 is a bottom plan view of the structure.

Figure 8 is an end elevation of the structure.

Figure 9 is an end elevation of the modified form of the structure.

Referring to the drawings, I have shown at 1 a rectangular plate having the side flanges 1x. At each end of the plate is secured thereto a U-shaped bracket 2 best shown in Figure 8 and at the top of the bracket the bracket arms are connected by a handle bar 3 by which the device may be moved from place to place, member 3 also serving to reinforce and strengthen the structure. At the top of the arms 2 and extending longitudinally of plate 1 are longitudinal reinforcing bars 4. Further reinforcement may be provided by a bracket arm 5 carried by the flanges of plate 1 and having diagonally and upward strut extensions 5x which are welded or otherwise secured to members 4.

Referring to the bottom plan view, Figure 7, it will be seen that the plate 1 is formed with a plurality of sets of apertures to receive sticks. Each set comprises four apertures and each set of four apertures is so positioned that rotation of one of the clamp-wheels, or more aptly, gripper-wheels, will effect the gripping or release of four sticks. The gripper wheels are shown at 6. Each gripper wheel is pivotally carried by a plate 7 which may be riveted to plate 1 by rivets 8. Thus by cutting off the heads of two rivets any one of the plates may quickly be removed from plate 1 together with its gripper wheel 6. The gripper wheel in each case does not move directly over the surface of plate 7 appropriate thereto, the wheel being held slightly elevated by a washer 9, Figure 4, which is threaded to receive threaded stud 10, the latter passing through plates 1 and 7, washer 9, gripper wheel 6, and finally, to a locking disk 11. Threaded stud 10 may also pass through a washer 11x at the underface of plate 1.

Each plate 7 is formed with downwardly extending lips 7x which project through the stick apertures of plate 1 as shown in Figures 4 and 5; and welded or otherwise secured to the downwardly extending lips, are channeled stick-receiving plates 12. The upper ends 12x of the channeled stick-receiving members 12 project vertically with respect to plate 1 and are outwardly flared, being also formed each with a rivet lug 12xx.

Above plate 1 the side of each stick-receiving aperture opposite the upwardly extending and flared section of each channeled stick-receiving member 12, is provided with the flared upward extension 13x of an angle plate 13 which may be riveted or welded to an appropriate plate 7; the flared upward extension 13x in each case may be formed with a rivet lug 13xx and the lugs may be riveted or welded together.

Each assembly of two stick-receiving guides comprising the outwardly flared members 12x, 13x, above plates 1 and 7, is associated with a stick-engaging spring which serves to temporarily hold the stick upon its insertion in the device preliminary to the gripping action of the appropriate wheel 6.

Referring to Figure 4 it will be seen that one end of the spring passes through an opening at a in outwardly flared member 13x and the spring is then reversely bent around and following the contour of outwardly flared member 12 (Figure 3). The spring, which is indicated by the numeral 14, then passes through an eye at b in flared member 12 (Figure 5) and extends downwardly within the stick-receiving aperture, in each case, being outwardly curved near its end to form a relatively broad contact area for the stick as shown in Figure 5.

It will be noted by reference to Figure 3 that at the tops of plates 1 and 7 the stick-guiding flared extension 12x and 13x abut only part of a stick-receiving aperture, in each case, i. e., part of the side area and one end of each stick-receiving aperture. One end of a stick-receiving aperture and part of its opposite sides are left free for the movement therein of gripper blade areas carried by the gripper wheels 6.

As stated above, each gripper wheel is operatively related to four stick-receiving apertures, and hence each gripper wheel is formed with four gripper blade areas 6x shown more particularly in Figure 3. Each gripper wheel is formed with a plurality of rack teeth, the rack teeth of one wheel lying opposite the rack teeth of an adjacent wheel so that the rack teeth of each set of two adjacent gripper wheels are engaged by the teeth of the double rack bar 15 which slides on the top of plate 1 under holding straps 16. A hand lever 17 is pivoted at 18 to a short bracket 19 carried by U-shaped bracket 2, Figure 8, and to hand lever 17 is pivoted at 20 to a link 21 in turn pivoted to a short bracket 22 carried by double rack bar 15. When the hand lever is moved downwardly toward plate 1 to its dotted line position, Figure 2, the gripper wheels are moved to their gripping position as shown in Figure 6, and the gripper blade sections 6x slightly cut into the edges of the sticks, firmly holding them in such manner that the weight of the confections on the sticks is wholly insufficient to dislodge the sticks during a dipping or other operation in which a confection-loaded rack is moved from one point to another. At the same time, movement of hand lever 17 upwardly to the position of Figures 1 and 2, will retract gripper blade sections 6x from the sticks, the slight pressure of springs 14 being insufficient to hold the stick-carried confections, and they will drop from the rack.

The distance between plate 1 and frozen confections within a plural-cavity mold of the usual type, which embodies a splash-pan, i. e., an upwardly extending section lying above the mold cavities, may be regulated by bracket feet carried by the rack as, for example, a set of upper permanently held bracket feet 23, Figures 7, 8 and 9, and a lower set of removable bracket feet 24. These bracket feet are adapted to rest upon the rim of the splash-pan.

Should a spring or outwardly flared extension of a stick-guiding assembly, or any other part of said assembly become deranged, it is only necessary to cut off the heads of the two rivets 8 which hold a plate 7 in position on plate 1, and to remove the plate, with its gripper wheel 6 having first been released from its pivotal connection with plate 1 by removal of threaded stud 10. A new plate 7 with its connected parts may then be applied to replace corresponding assembly needing repair.

In Figure 9 I have shown a modification in that for the angle plate 13 and the upwardly flared extension 12x of member 12 there is substituted a plate 25 spaced from plate 1 and above the same and having stick-receiving apertures bounded by guiding inclined walls. Plate 5 may have downwardly extending flanges to directly engage the flanges 1x of plate 1 for either permanent or removable connection thereto.

In usual course, plate 5 will be readily removable for instant access to the gripper wheel assembly. Suitable apertures may be formed in plate 5, and also plate 1, so that hot water and/or steam may be freely circulated over the surfaces of the various parts for cleaning and sterilizing.

In Figures 2 and 9 a usual type of stick is shown in position at 26 and in Figure 9 the top of the confection is indicated at 27.

It will be understood that various modifications may be made in the form and arrangement of the elements comprising the embodiment of the invention illustrated in the drawings.

It will be noted that when hand lever 17 is moved downwardly to carry the gripper areas into gripping position, handbar 17x carried by the hand lever will enter a recess at R (Figure 2) in link 21, thereby locking the gripper wheels against releasing rotation, and also enabling a greater swinging movement, in an operative direction, of the hand lever.

Having described my invention, what I claim and desire to secure by Letters Patent, is as follows:

1. A stick-holding rack comprising a frame having a normally horizontal supporting member, a plurality of wheels rotationally supported on said member, a plurality of stick-receiving and guiding devices in operative register with each wheel, a plurality of gripper elements carried by each wheel, and means for simultaneously rotating the wheels to bring the gripper elements of each wheel into engagement with a plurality of sticks held by said stick-receiving and guiding devices.

2. In a stick-holding rack, a normally horizontal plate formed with a plurality of sets of stick apertures, a plurality of wheels, each wheel being disposed intermediate a set of said apertures, a plurality of stick-engaging means carried by each wheel, and means for rotating the wheels in opposite directions.

3. A stick-holding rack comprising a normally horizontal supporting member, a plurality of carrying devices supported by said member, a wheel pivotally mounted on each carrying device, means including each carrying device for receiving and guiding a plurality of sticks, and means for simultaneously rotating the wheels, the wheels being formed with a plurality of stick-engaging sections whereby each wheel is adapted to simultaneously engage a plurality of sticks.

4. A stick-holding rack comprising a normally-horizontal plate formed with a plurality of sets of stick-receiving apertures, a plurality of wheels, each wheel being pivotally supported by the plate and having a plurality of stick-engaging sections, one for each stick-receiving aperture, rack teeth carried by each wheel, a rack bar engaging the rack teeth of the wheels, and a hand lever for longitudinally moving the rack bar in opposite directions.

5. A stick-holding rack constructed in accordance with claim 4, in which the wheels are arranged in oppositely disposed pairs and the rack bar is formed with oppositely disposed sets of teeth, the rack bar being interposed between each pair of wheels for simultaneous rotation of each pair in opposite directions.

6. In a stick rack in combination with stick-receiving and guiding means, a stick gripper means comprising a plurality of rotary members, each member carrying a plurality of gripper elements having an arcuate path of movement, means for simultaneously rotating said rotary members to carry the gripper elements of each rotary member into and out of gripper relation with a plurality of stick-receiving and guiding means, each stick-receiving and guiding means comprising upwardly extending opposed members having outwardly flared upper end sections adapted to engage one edge and part of the opposed side walls of a stick, leaving the opposite edge and the remaining part of the side walls of the stick exposed, in combination with a spring having one end held by said stick-receiving and guiding means, the spring then continuing in abutment with a flared section of said means and thence extending intermediate said flared sections for engagement with a stick placed therebetween.

7. In a stick rack in combination with stick-receiving and guiding means, a stick gripper means comprising a plurality of rotary members, each member carrying a plurality of gripper elements having an arcuate path of movement, means for simultaneously rotating said rotary members to carry the gripper elements of each rotary member into and out of gripper relation with a plurality of stick-receiving and guiding means, the stick-holding and receiving means comprising opposed normally horizontal plates, and aligned stick-receiving apertures formed in said plates, the plurality of gripper wheels being disposed intermediate the plates.

8. A stick-holding rack comprising a normally horizontal plate, a plurality of opposed sets of holding plates mounted thereon, stick receiving and guiding elements carried at the corners of each holding plate, a rotary gripper member pivotal to each holding plate, each gripper member being formed with a plurality of gripper sections whereby rotation will carry the gripper sections simultaneously into register with each of the stick-receiving and guiding means, rack teeth carried by the rotary gripper members, a rack bar intermediate each set of rotary gripper members, a hand lever, and a link connecting the hand lever with the rack.

9. A stick-holding rack constructed in accordance with claim 8 in which the hand lever is formed with a hand bar and the link is formed with hand bar abutment means in contact with which the bar is moved upon an operative movement of the hand lever, as and for the purpose set forth.

EDWIN L. ELWELL.